Jan. 13, 1953 E. W. WEAVER 2,625,285
INDUSTRIAL TRUCK
Filed May 28, 1947 6 Sheets-Sheet 1

INVENTOR.
ELVERTON W. WEAVER
BY
Richey & Watts.
ATTORNEYS

Jan. 13, 1953

E. W. WEAVER 2,625,285

INDUSTRIAL TRUCK

Filed May 28, 1947

INVENTOR.
ELVERTON W. WEAVER
BY Richey & Watts.
ATTORNEYS

Jan. 13, 1953 E. W. WEAVER 2,625,285
INDUSTRIAL TRUCK
Filed May 28, 1947 6 Sheets-Sheet 4

INVENTOR.
ELVERTON W. WEAVER
BY Richey & Watts
ATTORNEYS

Jan. 13, 1953 E. W. WEAVER 2,625,285
INDUSTRIAL TRUCK
Filed May 28, 1947 6 Sheets-Sheet 5

INVENTOR.
ELVERTON W. WEAVER
BY Richey & Watts
ATTORNEYS

Patented Jan. 13, 1953

2,625,285

UNITED STATES PATENT OFFICE 2,625,285

INDUSTRIAL TRUCK

Elverton W. Weaver, Cleveland Heights, Ohio, assignor to Towmotor Corporation, Cleveland, Ohio, a corporation of Ohio Application May 28, 1947, Serial No. 750,914

10 Claims. (Cl. 214—674)

This invention relates broadly to industrial trucks, and more particularly to improvements in vehicles of the type that are constructed for the transportation and elevation of material in and about industrial plants, loading docks and similar environs.

The primary object of this invention is to provide a chassis and body construction which are designed to facilitate maximum ease of operation of the truck, access to the driving compartment with minimum effort on the part of the driver, and greater visibility than afforded in vehicles of a similar character. The organization of the driving elements in the improved vehicle is further designed to afford ready access to the engine and other working parts of the machine, to accommodate a construction which is relatively small and compact, to enlarge the utility of the vehicle and facilitate optimum maneuverability thereof.

Industrial trucks that are powered by internal combustion engines may be classified in two types: (a) those in which the driver is compelled to operate the vehicle in a standing position on a platform rearward the engine and rear wheels of the truck; and (b) those in which a seat is provided over or between the front and rear wheels of the vehicle. The trucks of the first class (wherein a rear platform is provided) are necessarily operated from a standing position, which fatigues the operator and presents certain hazards of control during the translation of the truck. The platforms of such trucks place the operator an appreciable distance from the mast, and the engine and radiator structure obscure the view immediately forward the front wheels of the truck. All of this contributes to the discomfort of the operator and adds to the difficulty of control.

The other class of trucks (wherein the operator is provided with a seat intermediate the front and rear wheels) offers a partial solution to the deficiencies of the rear platform type, but all of such trucks heretofore constructed are subject to the objection that the operator's platform is elevated a substantial distance above the floor and is encumbered by various control members. These factors weigh heavily against the strength and endurance of the operator since the very nature of the work demands frequent departure from the machine and repeated remounting thereof. In summation, those trucks which have been formed with a low, easily gained operating platform have been of the rear stand-drive type, while those that are formed for operation with the driver in a seated position have been difficult of access and encumbered with floor board control mechanisms that impede the access to the driver's seat.

In the present invention the vehicle is constructed with a low-level, readily accessible driving platform—an arrangement of transmission and steering controls which will accommodate operation of the vehicle by the driver in either a standing or seated position. An organization of driving elements which will afford the operator maximum comfort and visibility, a chassis design which is compact and accessible and a body structure which will permit the operator to perform a day's work with greater accuracy and dispatch and with less fatigue than possible with the machines heretofore constructed.

Briefly, these improvements are attained by placing the engine on one side of the medial axis of the vehicle and mounting the clutch and transmission gearing in forward relation thereto. Then, carrying the transmission drive vertically downwardly to the front driven axles, this construction accommodates the support of the transmission shifting controls in the forward portion of the vehicle, and in contiguous relation to the other control units in operator's driving compartment. The engine and transmission assembly is enclosed in a sheet metal housing which constitutes the side wall panels of the vehicle body. The inner panel is disposed in the plane of the longitudinal axis of the truck and defines the side wall of the driver's compartment. Since the propeller shaft is disposed well above the vehicle axles, the steering gear housing and drag link assembly may be conveniently mounted between engine and transmission and within the confines of the engine enclosure. With the chassis thus formed, the opposed side of the vehicle may be provided with a drop floor or low-level platform and the body may be designed with a side entry driver's compartment of adequate size to facilitate freedom of movement of the machine operator.

The tilting mechanism for the mast as contemplated herein is also designed to accommodate ready access to the low-level open platform. Heretofore it has been the practice to provide tilting arms and actuating linkage for the mast on each side of the vehicle. Obviously, such structure would preclude free entry to the driving compartment; hence, in the present design, a single hydraulic tilt cylinder assembly is mounted in the plane of the longitudinal axes of the vehicle, and in aligned relation with the vertical lift cylinder in the mast. Thus, it will be seen that the improved combination of the vehicle driving elements, the chassis arrangement and the body design all cooperate to produce a vehicle that is exceptionally easy to operate, and all contribute to a design that will reduce the physical demand upon the operator.

The manner in which these elements cooperate to produce this new and useful result will be brought out in connection with the description of the drawings in which.

General arrangement of chassis parts

Figure 1:
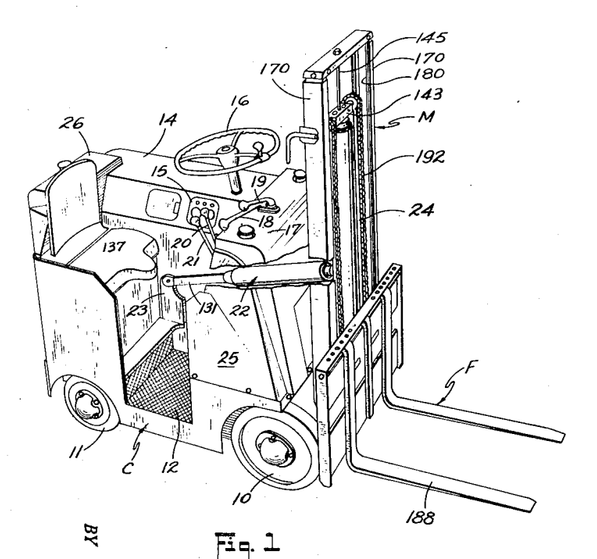
Fig. 1 is a perspective view from the driver's side of the truck with portions of the body broken away to show the tilt cylinder connections with greater clarity.

The frame of the vehicle as indicated generally at C supports a mast M which, in turn, supports a carriage and fork assembly F. The vehicle is driven by the wheels 10 and is steered by the rear wheels 11. The floor boards or driver's platform 12 is approximately the height of the center of the driving wheel 11, which in practice is seldom more than nine inches from the ground. The portion of the body rearward the platform 12 is provided with a seat 13 disposed to accommodate a semi-standing position of the driver. As will be seen in Fig. 1, the engine and driving mechanism associated therewith are encased by a hood 14 which includes an instrument panel 15 for the reception of the gauges. The panel is further provided with a hand hole and sliding cover plate therefor, to accommodate access to the engine chamber. The steering wheel 16 is disposed above the hood 14 which is apertured to receive the steering column 16a. A cowling 17 is provided to protect the fuel and oil tanks which are disposed in spaced relation with each other to accommodate the centralization of the gear shift levers 18 and 19 and control linkage 18a and 19a therefor. The hydraulic system is controlled by a pair of levers 20 and 21 which are mounted rearwardly of the oil tank O and provided to operate a master valve V for the control of the respective elements in the system. The mast tilting cylinder 22 is mounted in the plane of the longitudinal axis of the vehicle, the rear end thereof being supported by a bar 131 which is pivoted to a bracket 23 attached to the frame 14. The outer end of the piston rod is mounted for pivotal movement on ears 25 fixed upon the left cylinder 24.

Figure 5:
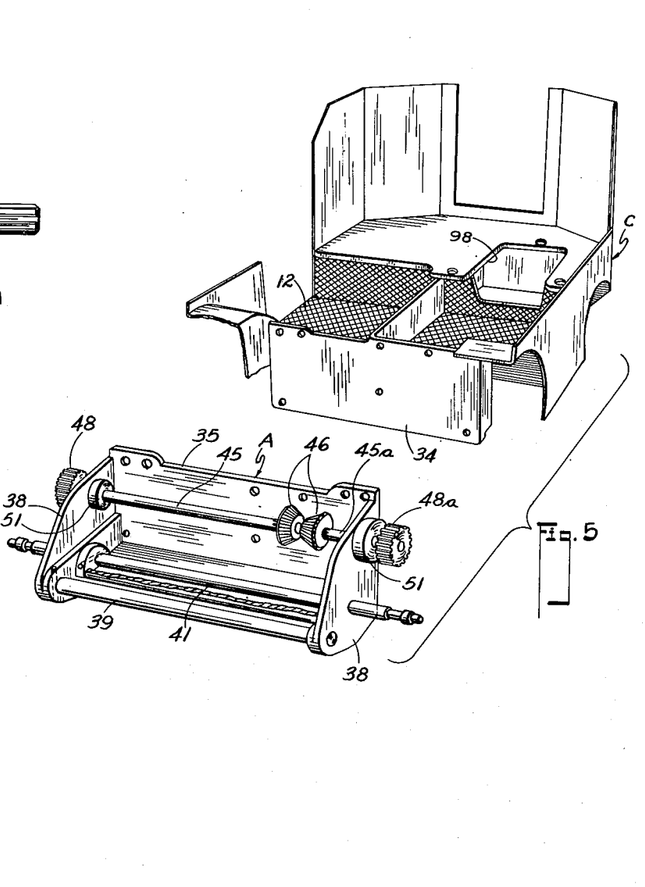
Fig. 5 is a view in perspective of the basic frame structure, including a perspective schematic view of the drive axle carrier preliminary to the assembly thereof with the frame.

The engine E is mounted on the frame C within a recess in a side portion 98 thereof (Fig. 5). The power drive is transmitted from the engine to the front wheels of the vehicle through the propeller shaft, clutch 30, universal joints 31, and the gear train in the transmission case. Since the engine may be of any conventional form, a detailed description thereof is deemed unnecessary herein, save that the cooling system, including the radiator 26, and fan are mounted on the frame in the rearward portion of the body. A power take-off from the engine operates a hydraulic pump P which supplies fluid under pressure to the cylinders in the hydraulic system.

Front wheel drive assembly

The driving axle is supported by a carrier A which is bolted to an end plate 34 in the forward end of the frame. The axle carrier is formed with a companion plate 35 drilled for assembly in face to face relation with the plate 34.

Figure 2:
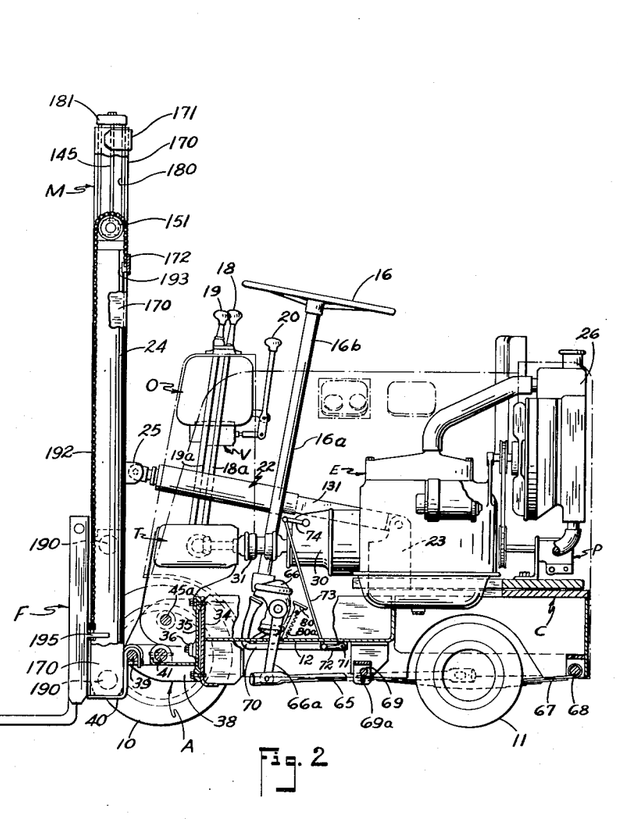
Fig. 2 is a side elevation of the truck, with the sheet metal housing removed and with certain parts broken away, and shown in section.
Figure 4:
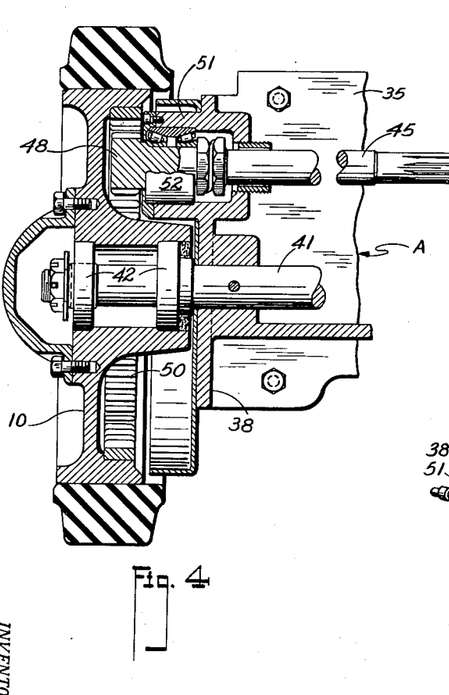
Fig. 4 is a vertical sectional view through the front wheel drive assembly.

As will be seen in Fig. 2, the transmission T is secured to the forward face of the plate 35 of the axle carrier A by screws 36. The sides of the carrier A are formed with a pair of forwardly disposed flanges 38 which are bored for the reception of a hinge shaft 39 for the support of the mast. The base of the mast is provided with brackets 40, which are formed with hooked ends thereon adapted for pivotal engagement with the shaft 39. The free ends of the bracket straps 40 are provided with cross bolts to restrain vertical movement of the mast. The flanges 38 of the carrier A are further machined to support the front dead axle shaft 41 for the wheels 10, which, as will be seen in Fig. 4, are supported upon anti-friction bearings 42. In the interest of clarity, live axles 45 and 45a are shown in Fig. 5 as mounted in the axle carrier A; in practice, of course, the axle shafts are included in the transmission assembly which is mounted on the carrier. In Fig. 5, the bevel gears 46 represent schematically the driving gears of a differential unit, the idling pinions and driving gears being omitted, since such parts are shown in detail in Fig. 7. As will be seen in Fig. 4, the axle shaft 45 is formed with a spur gear 48 on the end thereof, which is intermeshed with an internal ring gear 50 mounted in the driving wheel 10. A cup 51 is welded to the flange 38 to reinforce the structure and provide a seat for the anti-friction bearing 52.

Steering and controls

The steering gear casing 66 is mounted on the frame C in contiguous relation to the engine and subjacent the medial axis of the crankshaft. The steering arm 66a, which is operatively connected to the worm in the steering gear case, is pivotally connected to the forward end of a drag link 65. As will be seen in Figs. 2 and 3, the location of the gear casing 66 and the steering arm 66a affords a construction of a platform for the driver which is clear and free from encumberances.

The rear wheels, which constitute the steering wheels, are mounted on stub shafts supported on the dead axle 60 in the manner customary in automotive practice. The steering knuckles 61 are integral with the stub shaft assemblies and are connected by a tie rod 62. An arm 64 which is integral with the left steering knuckle connects the drag link 65 and stub axles in the usual manner.

A clutch pedal 70 is mounted on a cross shaft 71, which in turn supports an arm 72 having a link 73 connected thereto which is interlinked with a second arm 74, coupled with a clutch actuating mechanism of conventional design.

The rear axle is mounted upon a single centrally disposed leaf spring 67 which is pivoted to the frame at the rear thereof upon a pin 68. The forward end of the main leaf of the spring is slidably mounted between a pair of spaced pins 69 and 69a which function as a shackle for the forward portion of the spring. The provision of a single centrally located spring facilitates maximum turning movement of the steering wheels, thereby increasing the maneuverability of the vehicle. As will be seen in Fig. 14, a counterweight W is bolted to the frame C superjacent the spring 67.

Figure 3:
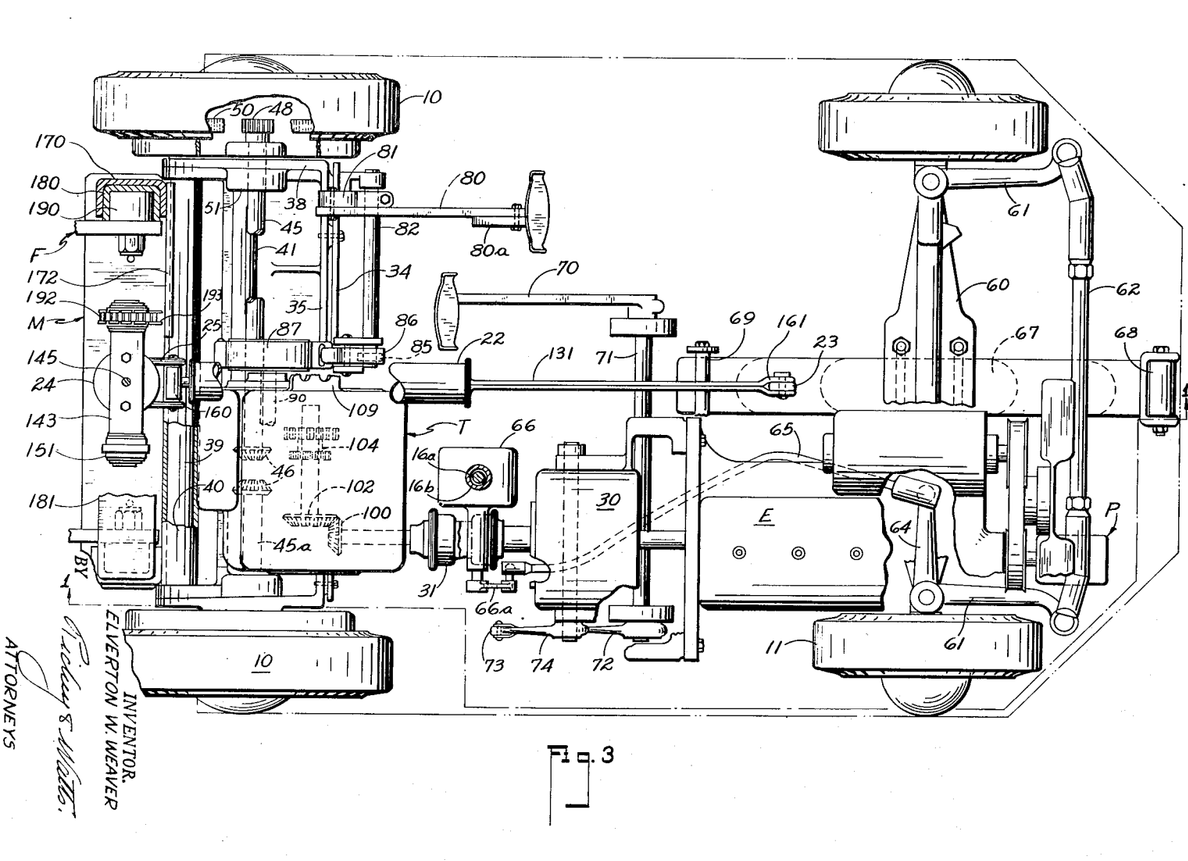
Fig. 3 is a plan view of the truck with the major portion of the frame structure and sheet metal housings removed in order to illustrate the relation of the driving elements to the chassis.
Figure 6:
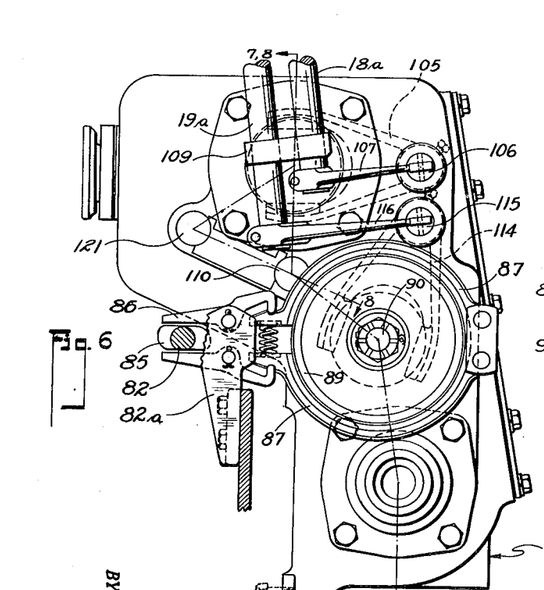
Fig. 6 is a side elevational view of the transmission.

The brake pedal 80 may be provided with ratchet teeth 80a to facilitate the retention of the pedal in its actuated position when desired. The pedal is mounted for free rotative movement on a cross shaft 82 (Fig. 3) and is adjustably connected to lever 81 which is clamped upon the cross shaft 82. A cam 85 adjacent the supporting bracket 82a (Fig. 6) is mounted on the inner end of the shaft 82. When the cam is revolved consequent the actuation of the clutch pedal, it draws the inner ends of a pair of pivotally mounted fingers 86 toward each other, and thus draws brake shoe segments 87, with which the fingers are engaged into impinged relation with the brake drum 89. The drum 89 is mounted on an intermediate cross shaft 90 in the transmission (Figs. 3 and 7).

*Transmission construction*

The transmission T embodies the usual housing which is secured through bolts 36 to the front axle carrier A.

Figures 7, 9:
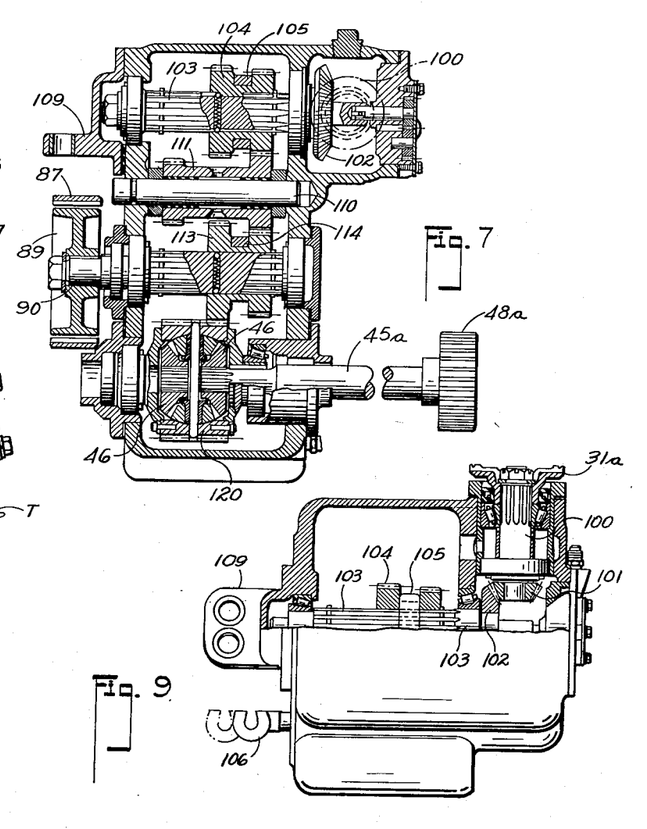
Fig. 7 is a section through the transmission taken on the line 7—7 in Fig. 6.
Fig. 9 is a plan view of the transmission with a portion of the gear case broken away in order to illustrate driving connections from the propeller shaft.

As seen in Fig. 9, a forward coupling portion 31a forms a part of a universal joint which is connected to a longitudinally disposed bevel pinion shaft 100 mounted in suitable bearings in the transmission housing. A driving bevel pinion 101 is mounted on a shaft 100 which is seated in a sleeve adapted for adjustment compensative of wear. A second bevel gear 102 drives the high-speed countershaft 103, which is mounted in anti-friction bearings in the customary manner. The forward and reverse gear 104 is formed with right and left gears of different size which are separated by a groove adapted to receive shifter fork 105. The gear unit 104 is splined to the shaft 103, and the shifter fork 105 effects the sliding movement thereof upon actuation of a rod 106 linked to an arm 107 operated by the control rod 18a. The control rods 18a and 19a are pivoted in a bracket 109 mounted on the transmission housing.

Referring to Fig. 7, a fixed countershaft 110 is mounted in the housing and carries an idler gear 111. The idler gear 111 is also formed with right and left gear elements, the right gear being arranged for engagement with the right hand gear of the gear unit 104, the left gear being arranged for engagement only with the left hand gear of a high and low shifter gear 113 which is splined to a jack shaft 90. A shifter fork 114, mounted on a bar 115 and coupled with a lever 116, is actuated by the control rod 19a. The left hand portion of gear 113 in Fig. 7 is in constant mesh with a wide spur gear 120 of the differential. The drive gears 46 on the axle shafts 45 and 45a are illustrated in Fig. 7, the shaft 45, however, being omitted in this drawing in the interest of clarity.

Figure 8:
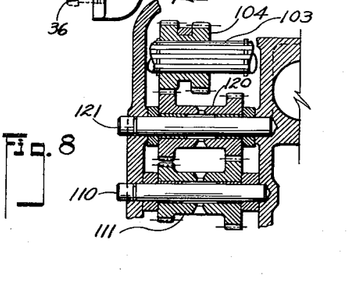
Fig. 8 is a section taken on line 8—8 of Fig. 6, illustrating the countershaft and reverse drive gearing.

A reverse idler gear 120 having right and left hand gear elements is mounted on countershaft 121. As shown in Fig. 8, the right hand gear of the unit 120 is in constant mesh with the right hand gear of the idler gear 111, but the left hand gear of reverse idler 120 is arranged to mesh only with the left hand gear of the forward and reverse gear 104.

In operation, two forward speeds, as well as two reverse speeds, are available, the control rod 18 regulating a forward and reverse operation, and the control rod 19 regulating the gears for high and low speeds. In Fig. 7 the gears are shown positioned for forward operation at high vehicular speed. The right hand gear of the forward-reverse gear unit 104 is intermeshed with the right hand gear of idler 111 on the countershaft, thus the forward-reverse gear unit 104 will drive the idler gear 111 directly. The high and low gear 113 is shown in Fig. 7 as positioned to the right with the left hand portion thereof entrained with the spider gear 120 of the differential, and the right hand gear intermeshed with the right hand gear of the idler 111. The left hand gear of the gear unit 113 is formed with a greater number of teeth than the right hand gears of the gear units 104 and 111; hence, when the gear unit 113 is shifted to the left (Fig. 7) with its left hand gear entrained with the smaller left hand gear of idler 111 and the spider gear 120, the vehicle will be driven at a slower speed.

In shifting into reverse, the left hand gear of the gear unit 104 (which normally runs free), is engaged with the lefthand gear of the reverse idler 120. Since the right hand gear of the reverse idler 120 is in constant mesh with the right hand gear of the idler 111, the direction of the rotation of the gear 111 and the other gears entrained therewith will be reversed.

Since the countershafts are parallel to the driving wheels, the driving connection from the engine may be placed on one side of the transmission housing, and the power take-off may be directed toward the centerline of the vehicle and downwardly to the wheels. This accomodates the support of the engine remote from the centerline of the vehicle and the disposition of the propeller shaft at a height which will clear the steering gear casing and the linkage associated therewith.

*Hydraulic system*

Figures 14, 15, 16:
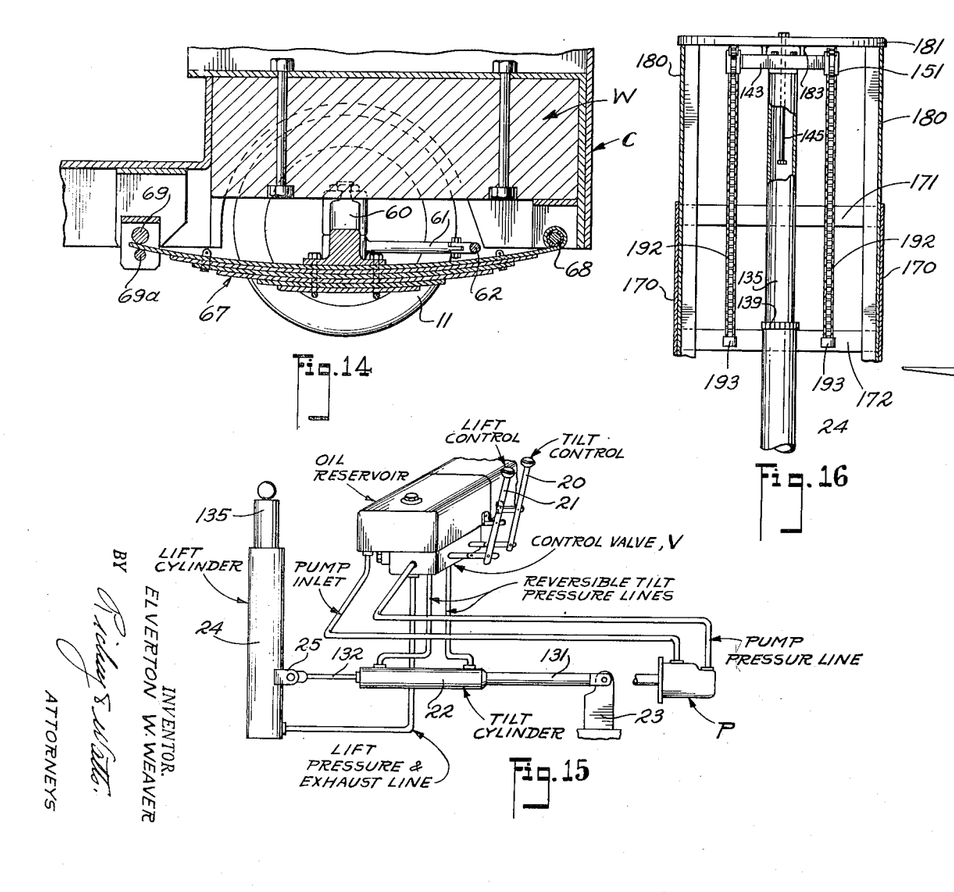
Fig. 14 is a vertical sectional view of a fragmentary portion of the rear axle and spring assembly.
Fig. 15 is a schematic diagram of the hydraulic circuit.
Fig. 16 is an elevational view partially in section of a fragmentary portion of the mast assembly shown in an extended position.

The hydraulic system includes five basic elements illustrated diagrammatically in Fig. 15. These elements comprise an Oil Reservoir, a Control Valve Pump P (driven by the engine), a Tilting Cylinder, and a Hoist or Lifting Cylinder, together with the hydraulic lines therefor. Since the arrangement of the valves and hydraulic lines for the system forms no part of the present invention, a detailed description thereof is deemed unnecessary herein. As indicated on the diagram, the pump is formed with an inlet line leading from the Oil Reservoir, and a pressure discharge line leading to the control valve V. The control valve is equipped with a lift control lever and a tilt control arm. When the lift control lever is adjusted to effect the elevation of the carriage, fluid under pressure is directed to the lift cylinder 24 to raise the piston 135. When the lift valve is adjusted to "lower" the carriage, the line from the lift cylinder is brought into communication with the reservoir, and the weight of the carriage and mast causes the piston in the lift cylinder to return to its lowered position.

Figures 10, 11, 12, 13:
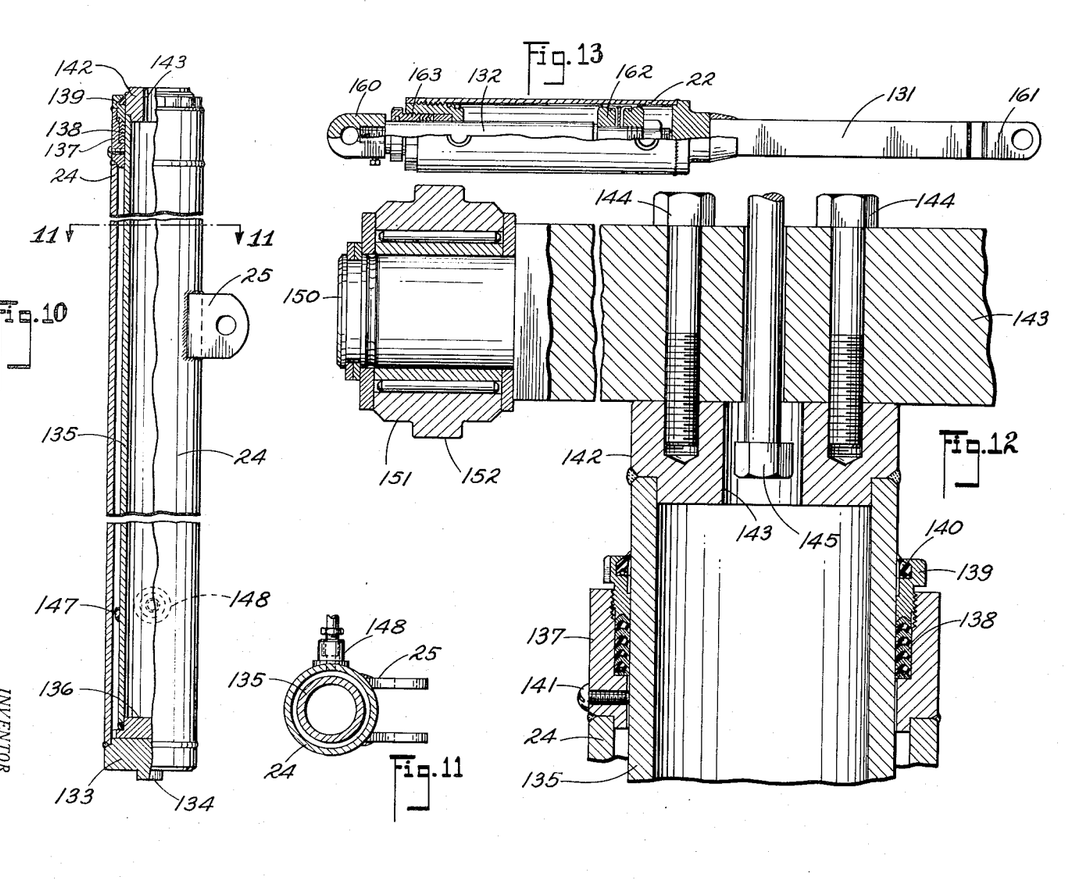
Fig. 10 is an elevational view, partially in section through the hoist cylinder.
Fig. 11 is a transverse section therethrough taken on line 11—11 of Fig. 10.
Fig. 12 is an enlarged sectional view of the crosshead and the connection therefor with the hoist cylinder.
Fig. 13 is an elevational view partially in section through the mast tilting cylinder.

The cylinder 22 for tilting the mast is pivoted to the frame bracket 23 by means of a bar 131 fixed to the inner end of the cylinder body. A piston rod 132 is pivoted in ears 25 which are affixed to the lift cylinder. When the tilt control lever is adjusted for "forward" tilting movement, fluid under pressure is admitted to the cylinder below the piston head and the valve is regulated to open the line in the opposed end of the cylinder. Reverse connections are made when the tilt cylinder is set for "rearward" tilt.

Details of construction of the lift cylinder are illustrated in Figs. 10–12. The cylinder 24 is formed with a cap 133 on the base thereof, which is provided with a boss 134 constituting a dowel for centralizing the cylinder in the carriage assembly. A tubular piston 135 is mounted in the cylinder, the lower end thereof being closed by cap member 136. The upper portion of the piston 135 slides within a fluid seal, which is retained by a ring 137 affixed upon the upper portion of the cylinder. The cylinder is sealed by packing rings 138, which are compressively engaged with the piston by a sleeve 139. The sleeve is threaded in the ring 137, and the outer end thereof is preferably formed for the support of a wiper ring 140. A bleed screw 141 is provided in the upper end of the cylinder to facilitate initial filling thereof. The upper cap 142 for the piston is welded or otherwise affixed to the piston and is attached to a crosshead member 143 by cap screws 144. The cap is formed with an aperture 143 thereon to receive a "pull-down bolt" 145 which assures the full return movement of the lift assembly.

The crosshead is formed with journal bearings 150 on the outer end portions thereof for the reception of chain guides 151 which are retained against longitudinal movement in any conventional manner. The chain guides are formed with circumferential flanges 152 designed to engage the side links of roller chains 192 and effect the alignment thereof relative to the crosshead.

The ears 25 may be welded directly to the lift cylinder 24, since the packing gland or seal is disposed in the upper end of the cylinder. Hence, any distortion of the cylinder 24 in the zone of the welded connection will not effect the operation of the piston. A ring 147 is mounted on the piston adjacent its lower end to delimit the vertical movement thereof within the cylinder. The guide ring may be formed with liberal clearance with the walls of the cylinder, since a slight lateral movement of the piston will not impair the operation thereof.

A fitting 148 is provided on the lift cylinder for the support of the conduit or feed line, illustrated diagrammatically in Fig. 15.

The piston rod 132 in the tilting cylinder 22 is provided with an apertured cap 160 to accommodate a pivotal connection between the piston rod and the ears 25 on the lift cylinder. The bar 131 on the rear of the cylinder is provided with a yoke 161 for connection with the bracket 23 on the frame C. The outer end of the cylinder is provided with a packing gland 163 to prevent leakage of the fluid about the piston rod.

Mast and carriage structure

As illustrated in Fig. 3, the mast assembly M includes a pair of outer channel members 170, which are laterally spaced by suitable cross members and the lower bracket 40, which is mounted for pivotal movement about the mast supporting bar 39. The upper ends of the channels 170 are supported in spaced relation by a cross member 171 and a second cross member 172 mounted in subjacent relation thereto serves to further brace the structure and also form an anchorage for the lift chains 192. A pair of inner channels 180 are nested for sliding movement within the channels 170, the upper ends thereof being united by a tie plate 181.

The carriage assembly F embodies a material handling fork 188 which is mounted on a frame or slide adapted for vertical translation on the mast. The frame is provided with rollers 190 supported for engagement with the inner walls of the channels 180.

Figure 17:
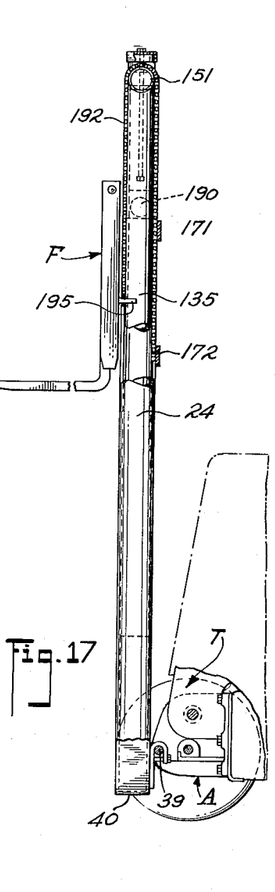
Fig. 17 is a similar side view thereof including a portion of the carriage.

The carriage assembly is elevated by a pair of roller chains 192, anchored at one end in brackets 193 secured to the cross member 172 which is secured in turn to the outer channel members 170. The chains are trained over the guide rollers 151, the lower end thereof being anchored in brackets 195 mounted on the frame of the carriage assembly F (Figs. 2 and 17).

When the parts are in their lowered position, as shown in Fig. 2, the admission of fluid under pressure to the cylinder will effect the distention of the piston 135 and the consequent elevation of the crosshead 143 and chain guides 151. The initial movement of the piston will cause the elevation of the carriage assembly F in the inner channel, such movement being greater than that of the piston due to the advantage afforded through the chain and roller combination. This action will continue until the crosshead 143 is brought into engagement with abutments 183, depending from the inner channel cross member 181. Further distention of the piston will lift the inner channel and thus extend the range of movement of the carriage assembly F. Since the motion of the inner channel is but half that of the carriage, there is no possibility of escapement of the carriage rollers from the channel.

When it is desired to lower the carriage, the hydraulic valve is adjusted to arrest the circulation of the pressure fluid, and the weight of the carriage assembly and parts associated therewith will cause the descent of the piston and the expulsion of the fluid from the cylinder. The retraction of the channels 180 is assured by a pull-down rod 145 which is suspended from the member 181 and provided with a nut adapted for engagement with the crosshead 143 during the descent thereof.

Although the foregoing description is necessarily of a detailed character, in order that the invention may be completely set forth, it is to be understood that the specific terminology is

I claim:

1. An industrial truck comprising a frame including a forward and rearward wheel mounting structure and a low-level intermediate platform extending from one side of the frame substantially to its longitudinal centerline, forward driving and rearward dirigible wheels mounted on said frame, a drive assembly comprising an internal combustion engine, a clutch, a drive shaft, a transmission mechanism and controls therefor, all disposed on the other side of said centerline, a steering mechanism disposed on the first named side of the centerline, and a power-operated lift mast supported on the forward end portion of the truck, said platform being below the axis of said drive shaft.

2. An industrial truck comprising a frame including forward and rearward wheel mounting structures and a low-level intermediate platform extending from one side of the frame to its longitudinal centerline, forward driving and rearward dirigible wheels mounted on said frame, a drive assembly comprising an internal combustion engine, a clutch, a drive shaft, a transmission and controls therefor, disposed on the other side of said centerline, a steering mechanism disposed on the drive assembly side of the centerline, a power-operated lift supported on the forward end portion of the truck, and a hydraulic tilt piston and cylinder assembly connected to said mast and frame and disposed substantially on said centerline, said platform being below the axis of said drive shaft.

3. An industrial truck comprising in combination, a frame structure, forward driven wheels, dirigible rear wheels, an internal combustion engine mounted superjacent one of said rear wheels, a propeller shaft extending from said engine and disposed on one side of the centerline of the truck, a transmission driven by the propeller shaft and disposed on the same side of the centerline as the engine, a driving connection between said transmission and said front wheels, said transmission being disposed between said forward wheels, manual control means extending upwardly from said transmission, a low-level operator's platform disposed between said front and rear wheels and below the axis of said propeller shaft, said platform extending from one side of the truck to its longitudinal centerline and being disposed rearwardly of said transmission whereby said platform is unobstructed by said transmission control means, and a power-operated lift mast supported forwardly of said front wheels.

4. An industrial truck comprising in combination, a frame, forward driven wheels thereon, brake means for said truck, a dirigible rear wheel, an internal combustion engine mounted superjacent said rear wheel, a clutch and propeller shaft extending from said engine and disposed on one side of the centerline of the truck, a transmission driven by the propeller shaft and disposed on the same side of the centerline as the engine, a driving connection between said transmission and said front wheels, manual control means extending upwardly from said transmission, a low-level operator's platform disposed between said front and rear wheels and rearwardly of said transmission whereby said platform is unobstructed by said transmission control means, a power-operated lift mast pivotally supported forwardly of said front wheels, a hydraulic tilt unit connected to said mast and frame and disposed substantially on the centerline of the truck, and clutch and brake pedals disposed on said one side of the truck centerline.

5. An industrial truck comprising a frame, forward driven wheels, dirigible rear wheels, an internal combustion engine mounted adjacent said rear wheels, said engine being disposed with its crankshaft parallel to and laterally spaced from the longitudinal centerline of the truck, a transmission device driven by the engine disposed in aligned relation with the engine and arranged to drive said front wheels, control mechanism for said transmission, a low-level operator's platform disposed between said front and rear wheels, said platform being disposed to one side of said engine substantially lower than the upper portions of said front wheels, said transmission being disposed forward of said platform whereby said patform is unobstructed by said transmission and by said transmission control mechanism, and a power-operated lift mast supported forward of said front wheels.

6. An industrial truck comprising in combination, a frame, forward driven wheels, dirigible rear wheels, an internal combustion engine mounted on said frame, said engine being disposed with its longitudinal centerline on one side of the longitudinal centerline of the truck, a transmission disposed on the same side of the centerline of the truck and arranged to drive said front wheels, a drive shaft extending longitudinally from said engine to said transmission, manual control means for said transmission, a low-level operator's platform disposed between said front and rear wheels, said platform being unobstructed by said transmission control means, a steering assembly including a gear case disposed between said engine and transmission and on the same side of the centerline of the truck as the engine, said steering case being disposed below said drive shaft, and a power-operated lift mast supported forwardly of said front wheels.

7. An industrial truck comprising in combination, a frame structure, forward driven wheels and drive shaft, dirigible rear wheels, an internal combustion engine mounted longitudinally adjacent said rear wheels, said engine being disposed with its crankshaft on one side of the truck centerline, a transmission disposed on the same side of the centerline as the engine and arranged to drive said front wheel drive shafts, a propeller shaft extending from said engine to said transmission, a bevel pinion thereon entrained with gearing for driving said wheel drive shafts, a low-level operator's platform disposed between the front and rear wheels and substantially lower than the upper portions of said front wheels, said transmission being disposed forwardly of said platform, whereby said platform is unobstructed by said transmission and a power-operated lift mast supported forwardly of said front wheels.

8. An industrial truck comprising in combination, a frame, forward driven wheels, dirigible rear wheels, an internal combustion engine mounted on said frame, said engine being disposed with its major axis on one side of the centerline of the truck, a clutch associated with said engine, a drive shaft extending forwardly from said clutch, a transmission driven by said drive shaft and disposed on the same side of the centerline of the truck as the engine, driving connections between said transmission and said front wheels, manual control mechanism for said transmission, a low-level operator's platform disposed between said front and rear wheels, said transmission being disposed in superjacent relation with said front axles whereby said platform is unobstructed by said transmission and said control mechanism thereof, and a power-operated lift mast supported forwardly of said front wheels.

9. In an industrial truck, a frame structure including a forward cross-member with a drive wheel axle carrier bolted to the forward face thereof, a dead axle rigidly supported on said carrier, drive wheels mounted on said dead axle, a transmission and differential assembly supported by said forward cross-member and extending forwardly thereof, live axles extending from said transmission and differential assembly and geared to said forward wheels, a prime mover, a drive shaft extending from said prime mover to said transmission and differential assembly, dirigible rear wheels for steering said truck, a cross bar on said carrier forward of said dead axle, and a power-operated lift mast supported by the crossbar on said axle carrier.

10. In an industrial truck, frame structure including a forward cross-member with drive wheel and axle carrier means bolted to the forward face thereof, a dead axle supported on said carrier, forward drive wheels rotatably mounted on said dead axle, a transmission and differential assembly supported by said forward cross-member and extending forwardly thereof, live axles extending from said transmission and differential assembly and geared to drive said forward wheels, a prime mover, a drive shaft extending therefrom to said transmission and differential assembly, said drive shaft and said assembly being disposed on one side of the truck centerline, dirigible rear wheels for said truck, and a power-operated lift mast supported by said axle carrier forward of said dead axle.

ELVERTON W. WEAVER.

REFERENCES CITED

The following references are of record in the file of this patent:

UNITED STATES PATENTS

| Number | Name | Date |
|---|---|---|
| 1,975,263 | Fageol | Oct. 2, 1934 |
| 2,320,600 | Howell | June 1, 1943 |
| 2,323,817 | Lee | July 6, 1943 |
| 2,362,129 | Gfrorer | Nov. 7, 1944 |
| 2,366,378 | Barrett | Jan. 2, 1945 |
| 2,368,121 | Dunham | Jan. 30, 1945 |
| 2,387,568 | Drott et al. | Oct. 23, 1945 |
| 2,415,015 | Lull | Jan. 28, 1947 |
| 2,428,223 | Johnson | Sept. 30, 1947 |
| 2,429,302 | Abbe | Oct. 21, 1947 |